United States Patent [19]
Cerasari

[11] 3,800,542
[45] Apr. 2, 1974

[54] FLOATING BOOM
[76] Inventor: Nicholas P. Cerasari, Wilmington, Del.
[22] Filed: Aug. 18, 1972
[21] Appl. No.: 281,850

Related U.S. Application Data
[63] Continuation-in-part of Ser. No. 25,450, April 3, 1970, abandoned.

[52] U.S. Cl.................................. 61/1 F, 114/.5
[51] Int. Cl........................................ E02b 15/04
[58] Field of Search.............. 61/1 F, 1, 5; 210/242, 210/DIG. 21; 114/.5 F

[56] References Cited
UNITED STATES PATENTS

| | | | |
|---|---|---|---|
| 2,693,161 | 11/1954 | Stubbs | 61/5 F |
| 3,586,870 | 8/1972 | Blomberg | 61/1 F |
| 3,592,005 | 7/1971 | Greenwood | 61/1 F |
| 3,563,036 | 2/1971 | Smith et al. | 61/1 F |
| 3,537,587 | 11/1970 | Kain | 61/1 F X |

Primary Examiner—Jacob Shapiro

[57] ABSTRACT

A floating boom for collecting and containing oil and floating debris in the open sea or in rough water composed of a plurality of upright support members having first weighted end and a second inwardly curved upper end; said upright support members being attached to connecting cables; a barricade wall material and a buoyant support tube which are both attached to the upright support members to form the boom. The floating boom can be towed by vessel around an oil spill or mass of floating debris to collect and contain same. The curved upper end of the support member decreases the loss of collected oil and floating debris due to action of waves in rough or open sea. The device is useful for collecting and containing oil and floating debris in the open sea, in rough water or in rivers, lakes, bays and lagoons.

11 Claims, 13 Drawing Figures

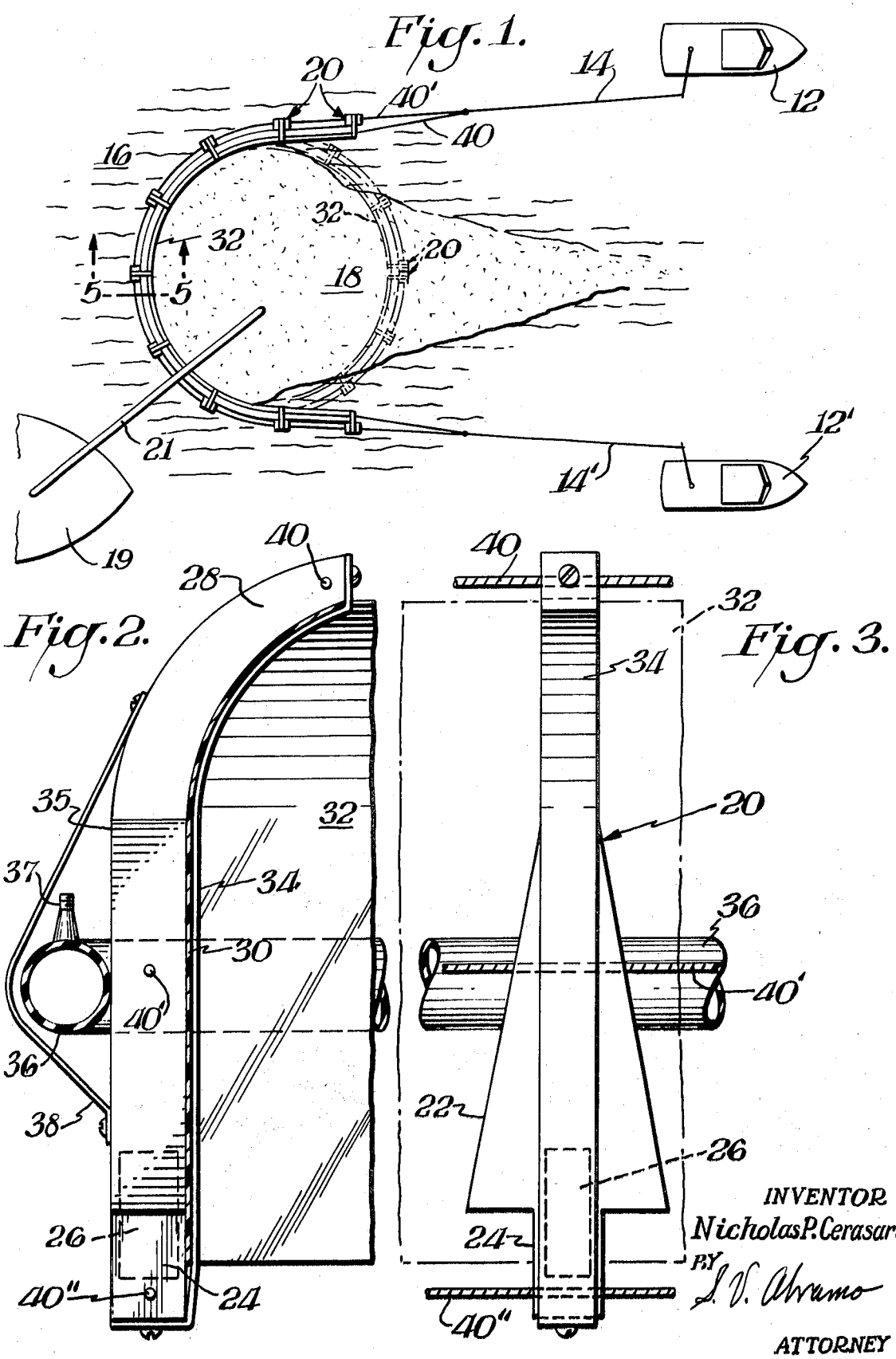

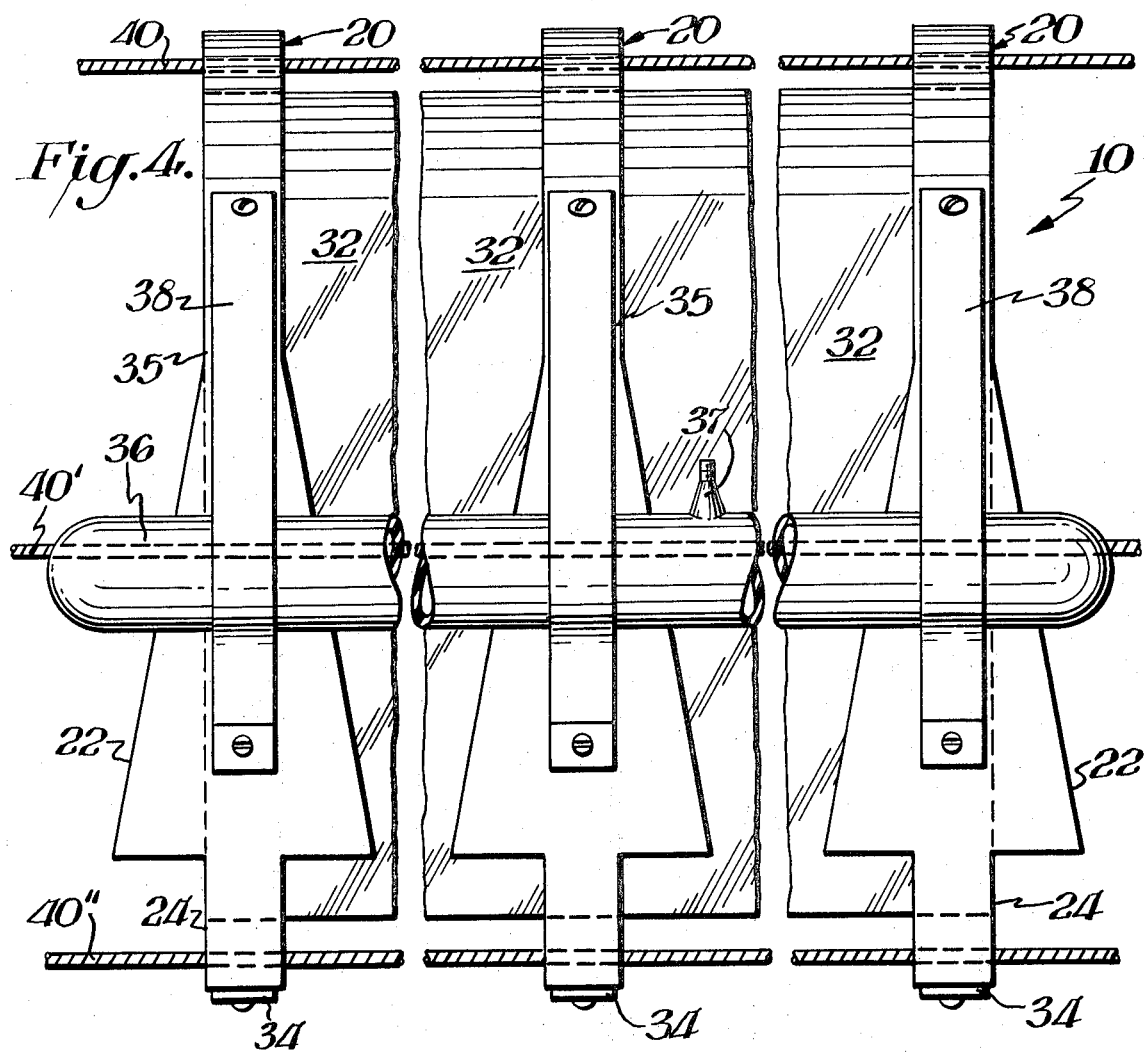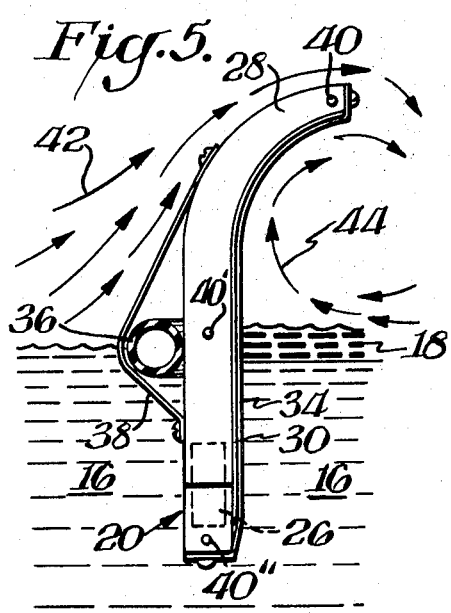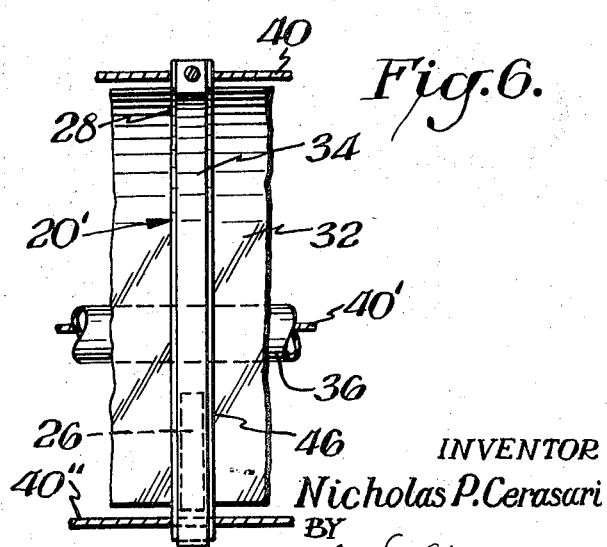

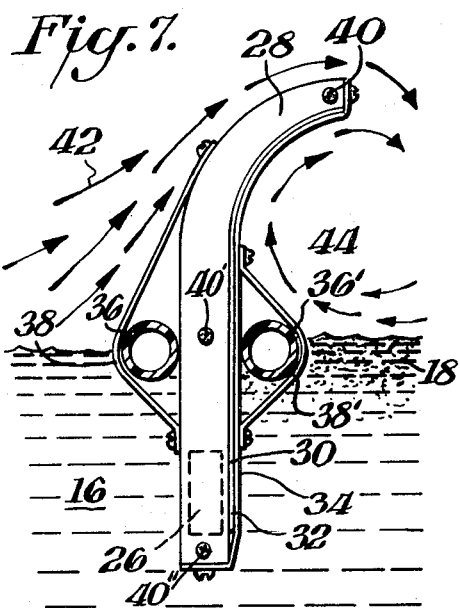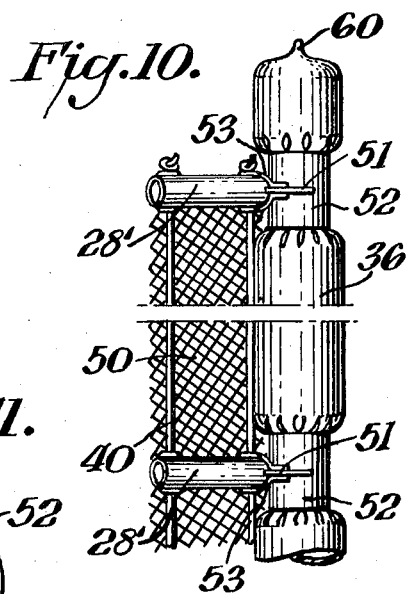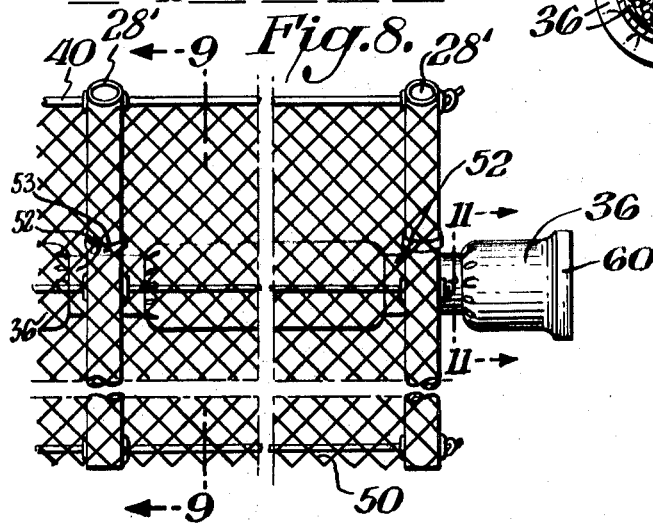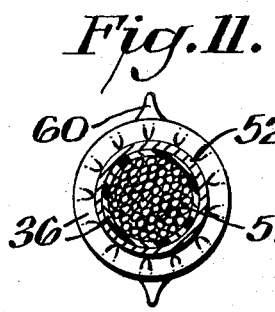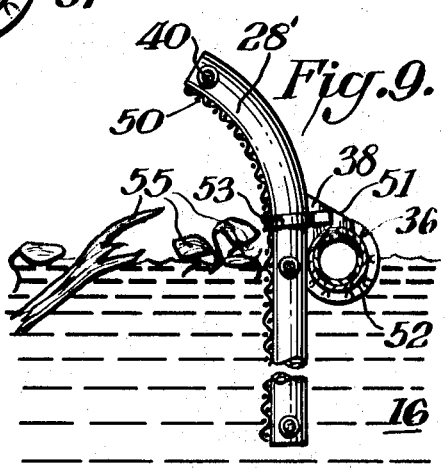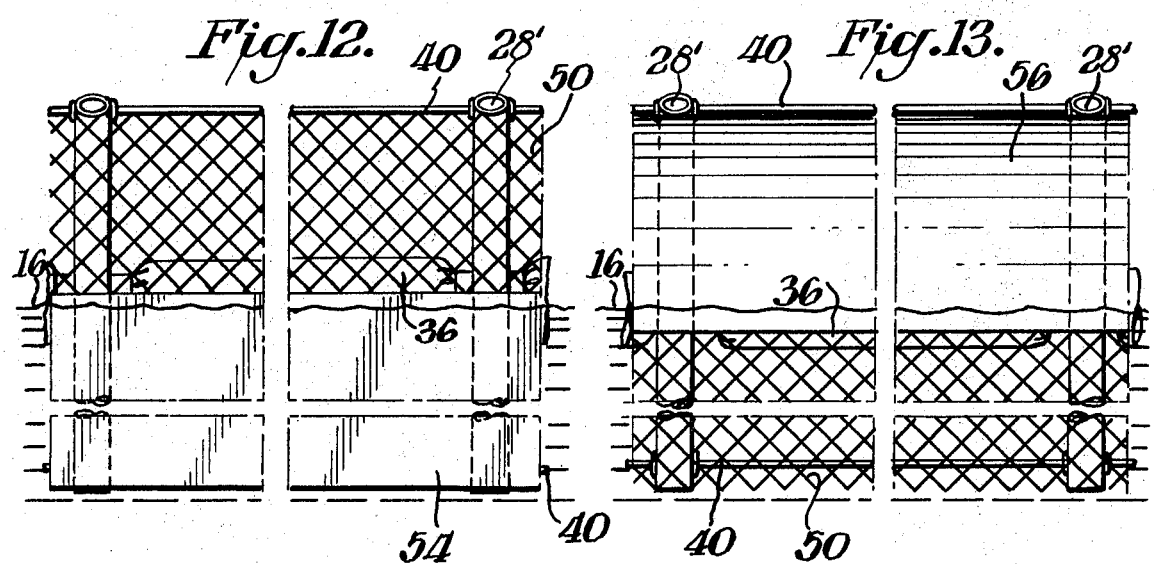

FLOATING BOOM

CROSS-REFERENCE TO RELATED APPLICATION

This application is a continuation-in-part of my co-pending application Ser. No. 25,450, filed Apr. 3, 1970 and now abandoned.

BACKGROUND OF THE INVENTION

This invention relates to a novel floating boom.

SUMMARY OF THE INVENTION

This invention is directed to a floating boom for containing and collecting oil and floating debris in the open sea or rough water and in rivers, lakes, bays and lagoons comprising a plurality of connector cables, a plurality of upright support members attached to said connector cables, said upright support members having a first curved end portion inwardly disposed towards a floating substance to be collected and a second weighted end portion at least one buoyant support tube attached to said upright support members having a valve means for inflating said buoyant support tube with compressed gas from a source of said gas or with a foamed material, and a barricade wall material attached to said upright support members, said connector cables adapted to be attached to at least one seagoing vessel to position said floating boom around the floating substance to contain and collect same.

This invention is also directed to a novel upriser comprising an upright support member having a first curved end portion and a second weighted portion, said plurality of uprisers being adapted for receiving a barricade wall material and an inflatable buoyant support tube to form a floating boom for containing and collecting a floating substance such as oil, other hydrocarbons, and chemicals and floating solid substances such as floating debris and vegetation in the open sea or rough water.

The floating boom and the upriser component thereof are useful for collecting and containing in the open sea or in rough water oil and other substances lighter than water. In this use, the ships or vessels towing the floating boom can travel at the rate of 3 to 5 knots or slower or faster.

DESCRIPTION OF THE PREFERRED EMBODIMENTS

The nature of the apparatus and the inventive embodiments thereof may be more fully understood by reference to the ensuing disclosure taken with the accompanying drawings in which:

FIG. 1 is a plan view of the oil spill barricade system.

FIG. 2 is a side elevational view illustrating a buoyant support member of this invention.

FIG. 3 is a front elevational view of the buoyant support member shown in FIG. 2.

FIG. 4 is a rear elevational view of several buoyant support members shown as used.

FIG. 5 is a cross-sectional view taken along lines 5—5 of FIG. 1, illustrating the functional aspects of the barricade of the invention.

FIG. 6 is a front elevational view of an alternate embodiment of the buoyant support member.

FIG. 7 is a cross-sectional view similar to FIG. 5 of an alternate embodiment having two alternately disposed buoyant support tubes.

FIG. 8 is a front elevational view of an alternate embodiment wherein the barricade is a wire mesh fencing material.

FIG. 9 is a cross-sectional view of the alternate embodiment of FIG. 8 taken along line 9—9 of FIG. 8.

FIG. 10 is a fragmented top plan view of the embodiment of FIG. 8.

FIG. 11 is a cross-sectional view of a slight modification of the buoyant tube taken along lines 11—11 of FIG. 8.

FIG. 12 is a front elevational view of an alternate embodiment wherein the uppermost portion of the barricade wall is wire mesh material and the lowermost portion is a solid material.

FIG. 13 is a front elevational view of an alternate embodiment wherein the uppermost portion of the barricade wall is a solid material and the lowermost portion is a wire mesh material or the barricade contains perforations.

The floating boom of this invention is a device which is partially submerged. The cable ends of the boom are towed by one or more ships around a body of floating substance which has been released, as for example, from a ship or from a leak or break in an oil bearing strata or floating vegetation for example hyacinth. The floating boom can be used to encircle an oil tanker which is spilling crude oil, hydrocarbon solvents and the like into a sea or a lake. The floating boom of this invention can be used to contain and collect any floating substance which has been released in a lake or sea.

The floating boom of this invention is particularly useful for collecting oil, hydrocarbon material and the like in the open sea or in rough water where wave action of the water normally prevents the use of a floating boom for this use. The upper curved portion of the boom decreases the loss of contained oil in a collected pool of oil due to the wave action of the sea especially at time of rough water. The fence embodiment of this invention is particularly useful for collecting and containing floating vegeation such as hyacinth. In this application the floating fence embodiment can be used to keep the intake pipes of water purification plants clear of vegetation and debris.

As shown in the drawings 10 shows the oil spill barricade of this invention. In FIG. 1 the oil spill 18 collected in water 16 is being collected by tow vessels 12 and 12' towing the floating boom or oil spill barricade of this invention. The vessels are towing the oil spill barricade by means of two cables 14 and 14'. Alternatively as shown in FIG. 2–6 a third connector cable 40" can be used. The oil barricade is held upright in water by means of a plurality of upright support membners 20 to which is attached a barricade wall material. The barricade wall material can be any oil impervious substance such as polyethylene, rubber, polyvinyl chloride, nylon, polychloroprene, plastic or rubber coated canvas and the like. A trailing vessel 19 siphons the collected oil by means of siphon tubes or tube 21. Alternately the trail vessel can siphon the oil to a separator which removes water from the oil and conveys the oil to a trail barge (not shown). The barricade is made buoyant by means of a buoyant support tube 36 attached to the upright members as shown in FIG. 2. In FIG. 2 the upright support member 20 of the oil barricade is shown. The upright support member has a curved end or neck 28 which in the oil barricade are inwardly disposed towards the oil spill being collected. The barricade wall material 32 is attached to the inward side of the upright support member which forms a leading edge 30 of the oil spill barricade. The opposite end of the upright support member is weighted by means of a weight 26 which is either contained in the body of support member in a reduced portion 24 of the upright support member or the weight can be attached to said end portion. The barricade wall material 32 is attached to the upright support member by means of a clamp 34. Alternately, the barricade wall material can be either cemented by means of an adhesive or it can be fastened to the upright support member by screws (not shown). The oil spill barricade is made buoyant by means of a buoyant support tube 36 which is inflated by a sour of compressed gas by means of the valve tube 37. The buoyant support tube is attached to the trailing edge 35 of the upright support member by a retaining loop. The upright support member is adapted to receive connector cables 40, 40' and 40" at points near the top, approximately at a middle line and near the bottom, respectively, of the upright support member. The connector cables can be placed in holes in upright support member or clamped by means of a cable clamp (not shown) to the upright support member.

FIG. 3 shows a rear view of the support member wherein the upright support member has a triangular shaped base 22. In FIG. 6, an alternate embodiment of the upright support member 20' is shown having a base of 46" of a different shape 46.

FIG. 4 shows the arrangement of a plurality of upright support members. The buoyant support tube 36 can be replaced by a plurality of buoyant support tubes each of which is separately inflatable.

The operation of the oil spill barricade is shown by FIG. 5 wherein arrows 42 and 44 show various directions of wave action hitting the oil spill barricade. The curved portion acts to contain and prevent oil 18 from being splashed out of the barricade by means of the inwardly disposed curved end portion of the upright support member.

An alternate use of the oil barricade of this invention is shown in FIG. 1. In this modification the connector cables are joined together so that the oil spill barricade completely encloses the oil spill. In this modification, the oil spill barricade can be anchored in one spot to collect oil leaking from an underwater oil or other source of oil or hydrocarbons. Additionally, the circular oil spill barricade can be drawn around a leaking tanker carrying oil, gasoline, or other hydrocarbons.

The alternate embodiment shown in FIG. 7 has two buoyant tubes 36 and 36', i. e. one located on the rear side of the boom and the other juxtaposition on the front of the boom. The second buoyant tube is attached to the boom by means of a second retaining loop 38'.

As stated above, the floating boom can also be a floating fence by replacement of all or part of the solid barricade wall material with a perforated barricade such as a fence material for example wire meshing or any other fence material adapted to contain the specific debris or substance to be collected. The perforations can be quite small, i.e., 0.25 inch or less. The perforation can consist of a wire mesh material wherein the fence wire making up the barricade is of a small diameter in the range of 0.32 inch or less to 0.25 inch to 0.5 inch or greater. The wire can be coated with a plastic such as polyvinyl chloride to provide a coroosion resisting surface to the wire mesh. The fence barricade can be made of rope, plastic and the like.

In FIG. 9 the floating fence embodiment is shown with the fence material 50 serving as the barricade. In FIG. 9, the floating fence is shown retaining floating debris 55 which can by hyacinths. The buoyant support member is attached to the upriser by means of a collar member 53 to which is attached an angle bracket 51 to which the sleeve 52 is attached. The buoyant support member is placed inside of the sleeve. In FIG. 10 an alternate embodiment of the upriser 28 is shown. As shown in FIG. 12 the uppermost portion of the barricade is shown as fence material 50 and the lowermost portion is solid material 54. In FIG. 13, the uppermost portion of the barricade 56 is solid whereas the lowermost portion 50 is fence material.

In FIG. 11, the buoyant support member 36" is shown containing a particulate foamed plastic 57 such as foamed polystyrene and the like. An end seal 60 which is optional is shown. Other means of sealing the end of the buoyant support tube can be used.

The solid barricade wall material can also be a semi-impermeable membrane.

The upright support members can be made of wood, plastic, metal and the like. Preferably, the upright support members are up to 3 to 10 feet long, although, they may be longer, for example up to 10 to 30 feet or longer. They are preferably 3 to 8 inches wide, however, they can have a width of up to 25 inches or wider.

The weight used to weigh the submerged end will vary depending upon the dimensions of the upright support member. The weight is adjusted to maintain approximately one-half to one-third of the upright support member submerged. Depending upon these factors, the weights will vary depending upon the dimensions of the upright support member. The weight is adjusted to maintain approximately one-half to one-third of the upright support member submerged. Depending upon these factors, the weights will vary from 0.5 to 5 lbs. up to 20 to 30 lbs. The buoyant tube or tubes are attached to the boom so that a desired amount of the boom will be submerged and the balance of the boom will be above the surface of water.

The cable used can be any cable or rope with steel cable, for example having a diameter of 0.5 to 1 inch steel cable being preferred.

The buoyant support tube can be made of vinyl chloride, oil-resistant rubber, polychloroprene and the like. The tube dimensions will be dependent upon the size of the upright support member. In general, the diameter of the tube will be 3 to 10 inches, however, tubes having diameters up to 2 to 4 feet can be used. The buoyant support tube can be filled with a particulate foam such as foamed polystyrene or foam polyurethane or the like.

The number of upright support members used is dependent upon the number required to give the floating boom stability. In general, the upright support members will be spaced along the boom at intervals of about 5 feet, however, upright support members up to 10 feet or less than 5 feet can be used.

The curved portion of the upright support member unexpectedly provide a means of preventing the escape of floating oil and floating solid in the open sea or in rough water being collected or contained. Also unexpectedly the curved portion provided stability to the boom and proved especially useful for moving a large mass of debris without the boom tipping.

The foregoing detailed description has been given for clarity of understanding only and no unnecessary limitations are to be understood therefrom. The invention is not limited to the exact details shown and described for obvious modifications will occur to those skilled in the art.

The embodiments of the invention is which an exclusive property or privilege is claimed are defined as follows:

1. A floating boom comprising of plurality of vertically spaced connector cables; a plurality of horizontally spaced upright support members attached to said connector cables, said upright support members have a first curved end portion and a second weighted end portion; at least one buoyant flexible support tube attached to said upright support members having valve means for inflating said buoyant support tube with compressed gas from a source of said gas; and a barricade material attached to said upright support members to form a barricade having a curved upper portion; said connector cables adapted to be attached to at least one seagoing vessel to position said floating boom around a floating substance with the curved upper portion of the barricade disposed towards said floating substance to contain or collect said floating substance.

2. The floating boom of claim 1 comprising at least three connector cables wherein the barricade is solid, semi-impermeable or perforated.

3. The boom of claim 1 wherein the upright support members are 3 to 30 feet long and 3 to 25 inches wide and the buoyant support tube has a diameter of 0.25 to 4 feet.

4. The floating boom of claim 1 wherein the upright support members are attached to three connector cables each separately positioned near an uppermost portion of said curved end portion, near water level and near a lowermost end of the upright support member.

5. The floating boom of claim 1 wherein extremities of each of the connector cables are connected to each other to provide a circular floating boom.

6. The floating boom of claim 1 having one buoyant support tube located on a side of the upright support member away from the direction of the curved end portion.

7. The floating boom of claim 1 having a buoyant support tube located on each side of the upright support members.

8. The floatong boom of claim 1 wherein the barricade material is a perforated material comprising wire having a diameter of 1/32 to ½ inch positioned 0.5 to 5 inches apart.

9. The floating boom of claim 8 wherein up to 66.66 percent of the barricade is an open mesh fence material and the remainder of the barricade is of a solid closed material.

10. The floating boom of claim 1 wherein the buoyant support tube is inflated with a particulate foamed plastic.

11. The floating boom of claim 1 wherein the buoyant support tube is attached to each upright support member at a position intermediate between said first curved end portion and said second weighted end portion.

* * * * *